(12) United States Patent
Mecking

(10) Patent No.: US 6,262,196 B1
(45) Date of Patent: Jul. 17, 2001

(54) CATALYST COMPOSITION

(75) Inventor: Stefan Mecking, Offenbach (DE)

(73) Assignee: Targor GmbH, Mainz (DE)

( * ) Notice: Subject to any disclaimer, the term of this patent is extended or adjusted under 35 U.S.C. 154(b) by 0 days.

(21) Appl. No.: 09/367,945

(22) PCT Filed: Feb. 23, 1998

(86) PCT No.: PCT/EP98/00857

§ 371 Date: Aug. 24, 1999

§ 102(e) Date: Aug. 24, 1999

(87) PCT Pub. No.: WO98/38228

PCT Pub. Date: Sep. 3, 1998

(30) Foreign Application Priority Data

Feb. 24, 1997 (DE) .............................................. 197 07 236

(51) Int. Cl.$^7$ ...................................................... C08F 4/44
(52) U.S. Cl. ........................ 526/114; 526/113; 526/118; 526/119; 526/160; 526/161; 526/172; 526/351
(58) Field of Search ................................... 526/113, 114, 526/118, 119, 160, 161, 172, 351

(56) References Cited

U.S. PATENT DOCUMENTS

| 3,725,379 | * | 4/1973 | Gaeth .................. 260/94.9 |
|---|---|---|---|
| 5,565,534 | | 10/1996 | Aulbach et al. . |
| 5,710,297 | | 1/1998 | Weller et al. . |
| 5,770,753 | | 6/1998 | Kuber et al. . |
| 5,786,432 | | 7/1998 | Kuber et al. . |
| 6,069,213 | * | 5/2000 | Nemzek et al. ............... 526/113 |

FOREIGN PATENT DOCUMENTS

| 655 088 | 11/1992 | (AU) . |
|---|---|---|
| 009 160 | 4/1980 | (EP) . |
| 114 434 | 8/1984 | (EP) . |
| 129 368 | 12/1984 | (EP) . |
| 416 815 | 3/1991 | (EP) . |
| 561 479 | 9/1993 | (EP) . |
| 632 063 | 1/1995 | (EP) . |
| 768 319 | 4/1997 | (EP) . |
| 95/11264 | 4/1995 | (WO) . |
| 97/48735 | 12/1997 | (WO) . |

OTHER PUBLICATIONS

Makro Chem, 94 (1981) 91–104 (Nr. 1479) Herrmann et al.
Jr. Poly. Sci, vol, 22, 3027–3042 (1984) Beach et al.
Trans. Metals, 1988, 349–360, Starzewski et al.
Rompp Chem., 9. Aufl, 1992, Bd 6, 5128–5129, Falbe et al.
Makromol. Chem, Rapid Com. Bd 12, Nr 12, Denger et al. 697–701, 1991.
Soga et al., Makromol. Chem. Rapid Com. 11, 285–291 (1990.
Derwent XP002041261 Feb. 15, 1993.

* cited by examiner

*Primary Examiner*—David W. Wu
*Assistant Examiner*—William Cheung
(74) *Attorney, Agent, or Firm*—Keil & Weinkauf

(57) ABSTRACT

A catalyst composition comprises at least two different polymerization catalysts of which a) at least one is a polymerization catalyst based on an early transition metal component and b) at least one is a polymerization catalyst based on a late transition metal component.

7 Claims, No Drawings

CATALYST COMPOSITION

The present invention relates to a catalyst composition comprising a polymerization catalyst based on an early transition metal component and a polymerization catalyst based on a late transition metal component.

The use of catalysts of the Ziegler type or the metallocene type for the polymerization of nonpolar olefins such as ethylene and propylene is known. Such catalysts usually comprise an early transition metal component, for example a halide-containing titanium or zirconium compound, in combination with an excess of a cocatalyst, for example an aluminum compound. Recently, the activation of suitable transition metal compounds using stoichiometric amounts of a cocatalyst such as a $[Ph_3C]^+$ or $[Me_2NPh]^+$ salt of a non-coordinated anion has been described.

The use of catalyst compositions comprising two or more different olefin polymerization catalysts of the Ziegler type or the metallocene type is known. For example, a combination of two catalysts of which one produces a polyethylene having a different mean molar mass than the other can be used for producing reactor blends having broad molecular weight distributions (WO 95/11264). The polymer blends obtained can have improved processing and use properties.

The addition of metal components, including later transition metals, to olefin polymerization catalysts based on early transition metals for increasing the activity or stability of the latter catalysts has been described many times (Herrmann, C.; Streck, R.; Angew. Makromol. Chem. 94 (1981) 91–104).

The synthesis of branched polymers from ethylene without use of a comonomer by means of bimetallic catalysts in which one catalyst oligomerizes part of the ethylene and the other copolymerizes the resulting oligomers with ethylene has been described (Beach, David L.; Kissin, Yury V.; J. Polym. Sci., Polym. Chem. Ed. (1984), 22, 3027–42. Ostoja-Starzewski, K. A.; Witte, J.; Reichert, K. H., Vasiliou, G. in Transition Metals and Organometallics as Catalysts for Olefin Polymerization. Kaminsky, W.; Sinn, H. (editors); Springer-Verlag; Heidelberg; 1988; S. 349–360). The last literature reference describes, for example, the use of a nickel-containing oligomerization catalyst in combination with a chromium-containing polymerization catalyst.

It is an object of the present invention to provide a catalyst composition which is suitable for preparing polyolefin blends comprising at least two different polyolefins.

We have found that this object is achieved by means of a specific catalyst composition.

The present invention accordingly provides a catalyst composition comprising at least two different polymerization catalysts of which a) at least one is a polymerization catalyst based on an early transition metal component and b) at least one is a polymerization catalyst based on a late transition metal component.

The invention further provides a process for the polymerization of olefins in the presence of the catalyst composition of the present invention. A preferred embodiment of the process of the present invention is a process for the homopolymerization of ethylene by means of the catalyst composition of the present invention, where particular preference is given to obtaining a blend of polyethylenes having different branching structures.

For the purposes of the present invention, an "early transition metal" is a metal of groups IIIa to VIIa of the Periodic Table of the Elements or a metal of the lanthlanide group, and a "late transition metal" is a metal of groups VIIa and IB of the Periodic Table of the Elements. The expressions "oligomerization" and "oligomer" refer to products or product mixtures which, based on the number average ($M_n$), consist of less than 400 monomer units. The expressions "polymerization" and "polymer" or "polyolefin" refer to products or product mixtures which, based on the number average ($M_n$), consist of more than 400, preferably more than 1000, monomer units. The term "polymerization catalyst" refers to catalysts which are suitable for preparing polymers or polyols, ie. for preparing products or product mixtures which, based on the number average, consist of more than 400 monomer units, preferably more than 1000 monomer units. The catalyst composition of the present invention comprises a) at least one polymerization catalyst based on an early transition metal component and b) at least one polymeerization catalyst based on a late transition metal component, of which each leads to the formation of a different polymer or polyolefin. Each transition metal component comprises exactly one transition metal.

As catalyst component based on an early transition metal, the catalyst composition of the present invention preferably comprises Ziegler catalyst components (as described, for example, in Falbe, J.; Regitz, M. (editors); Römpp Chemie Lexikon; 9th edition; Thieme; 1992; New York; volume 6, pp. 5128–5129) and/or metallocene catalyst components. Particular preference is given to metallocene catalyst components.

The Ziegler catalyst component is preferably a compound of a metal of group IVa (ie. titanium, zirconium or hafnium), Va (eg. vanadium or niobium) or VIa (eg. chromium or molybdenum) of the Periodic Table of the Elements. Preference is given to halides, oxides, oxyhalides, hydroxides or alkoxides. Examples of Ziegler catalyst components are, without constituting a limitation: titanium tetrachloride, zirconium tetrachloride, hafnium tetrachloride, titanium trichloride, vanadium trichloride, vanadium oxychloride, chromium trichloride or chromium oxide.

For the purposes of the present invention, metallocene catalyst components are, for example, cyclopentadienyl complexes. Preference is given to cyclopentadienyl complexes of metals of group IIIa and the lanthanide group (eg. lanthanum or yttrium), and also metals of group IVa (ie. titanium, zirconium or hafnium), Va (eg. vanadium or niobium) or VIa (eg. chromium or molybdenum) of the Periodic Table of the Elements; particular preference is given to cyclopentadienyl complexes of titanium, zirconium or hafnium. The cyclopentadienyl complexes can be, for example, bridged or unbridged biscyclopentadienyl complexes as are described, for example, in EP 129 368, EP 561 479, EP 545 304 and EP 576 970, monocyclopentadienyl complexes such as bridged amidocyclopentadienyl complexes as are described, for example, in EP 416 815, multinuclear cyclopentadienyl complexes as described in EP 632 063, tetrahydropentalenes substituted by pi ligands as described in EP 659 758 or tetrahydroindenes substituted by pi ligands as described in EP 661 300.

Preferred metallocene catalyst components are unbridged or bridged metallocene compounds of the formula I,

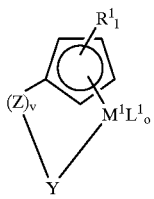

(I)

where

M¹ is a metal of group IIIa, IVa, Va or VIa of the Periodic Table of the Elements, in particular Ti, Zr or Hf, R¹ are identical or different and are hydrogen or $SiR_3^3$, where $R^3$ are identical or different and are each hydrogen or a $C_1$–$C_{40}$-group such as $C_1$–$C_{20}$-alkyl, $C_1$–$C_{10}$-fluoroalkyl, $C_1$–$C_{10}$-alkoxy, $C_6$–$C_{20}$-aryl, $C_6$–$C_{10}$-fluoroaryl, $C_6$–$C_{10}$-aryloxy, $C_2$–$C_{10}$-alkenyl, $C_7$–$C_{40}$-arylalkyl, $C_7$–$C_{40}$-alkylaryl or $C_8$–$C_{40}$-arylalkenyl, or $R^1$ is a $C_1$–$C_{30}$-group such as $C_1$–$C_{25}$-alkyl, eg. methyl, ethyl, tert-butyl, cyclohexyl or octyl, $C_2$–$C_{25}$-alkenyl, $C_3$–$C_{15}$-alkylalkenyl, $C_6$–$C_{24}$-aryl, $C_5$–$C_{24}$-heteroaryl such as pyridyl, furyl or quinolyl, $C_7$–$C_{30}$-arylalkyl, $C_7$–$C_{30}$-alkylaryl, fluorine-containing $C_1$–$C_{25}$-alkyl, fluorine-containing $C_6$–$C_{24}$-aryl, fluorine-containing $C_7$–$C_{30}$-arylalkyl, fluorine-containing $C_7$–$C_{30}$-alkylaryl or $C_1$–$C_{12}$-alkoxy, or two or more radicals $R^1$ can be joined to one another in such a way that the radicals $R^1$ and the atoms of the cyclopentadienyl ring which connect them form a $C_4$–$C_{24}$ ring system which may in turn be substituted, l is 5 when v=0, and l is 4 when v=1, Y is either a) an element of main group V (eg. nitrogen or phosphorus) or VI (eg. oxygen or sulfur) of the Periodic Table of the Elelements which bears one or two $C_1$–$C_{20}$-hydrocarbon substitutents such as $C_1$–$C_{10}$-alkyl or $C_6$–$C_{20}$-aryl, or b) 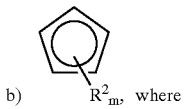 where R² are identical or different and are hydrogen or $SiR_3^3$, where $R^3$ are identical or different and are each hydrogen or a $C_1$–$C_{40}$-group such as $C_1$–$C_{20}$-alkyl, $C_1$–$C_{10}$-fluoroalkyl, $C_1$–$C_{10}$-alkoxy, $C_6$–$C_{14}$-aryl, $C_6$–$C_{10}$-fluoroaryl, $C_6$–$C_{10}$-aryloxy, $C_2$–$C_{10}$-alkenyl, $C_7$–$C_{40}$-arylalkyl, $C_7$–$C_{40}$-alkylaryl or $C_8$–$C_{40}$-arylalkenyl, or $R^2$ is a $C_1$–$C_{30}$-group such as $C_1$–$C_{25}$-alkyl, eg. methyl, ethyl, tert-butyl, cyclohexyl or octyl, $C_2$–$C_{25}$-alkenyl, $C_3$–$C_{15}$-alkylalkenyl, $C_6$–$C_{24}$-aryl, $C_5$–$C_{24}$-heteroaryl, eg. pyridyl, furyl or quinolyl, $C_7$–$C_{30}$-arylalkyl, $C_7$–$C_{30}$-alkylaryl, fluorine-containing $C_1$–$C_{25}$-alkyl, fluorine-containing $C_6$–$C_{24}$-aryl, fluorine-containing $C_7$–$C_{30}$-arylalkyl, fluorine-containing $C_7$–$C_{30}$-alkylaryl or $C_1$–$C_{12}$-alkoxy, or two or more radicals $R^2$ can be joined to one another in such a way that the radicals $R^2$ and the atoms of the cyclopentadienyl ring which connect them form a $C_4$–$C_{24}$ ring system which may in turn be substituted, and m is 5 when v=0, and m is 4 when v=1, $L^1$ can be identical or different and are each a hydrogen atom, a $C_1$–$C_{20}$-hydrocarbon radical such as $C_1$–$C_{10}$-alkyl or $C_6$–$C_{20}$-aryl, a halogen atom or $OR^6$, $SR^6$, $OSiR_3^6$, $SiR_3^6$, $PR_2^6$ or $NR_2^6$, where $R^6$ is a halogen atom, $C_1$–$C_{10}$-alkyl group, a halogenated $C_1$–$C_{10}$-alkyl group, a $C_6$–$C_{20}$-aryl group or a halogenated $C_6$–$C_{20}$-aryl group, or $L^1$ is a toluenesulfonyl, trifluoroacetyl, trifluoroacetoxyl, trifluoromethanesulfonyl, nonafluorobutanesulfonyl or 2,2,2-trifluoroethanesulfonyl group, o is an integer from 1 to 4, preferably 2, Z is a a bridging structural element between the two cyclopentadienyl rings and v is 0 or 1.

Examples of Z are groups $(M^2R^4R^5)_x$, where $M^2$ is carbon, silicon, germanium or tin, x is 1, 2 or 3 and $R^4$ and $R^5$ are identical or different and are each hydrogen or a $C_1$–$C_{20}$-hydrocarbon-containing group such as $C_1$–$C_{10}$-alkyl, $C_6$–$C_{14}$-aryl or trimethylsilyl. Z are preferably identical and are $CH_2$, $CH_2CH_2$, $CH(CH_3)CH_2$, $CH(C_4H_9)C(CH_3)_2$, $C(CH_3)_2$, $(CH_3)_2Si$, $(CH_3)_2Ge$, $(CH_3)_2Sn$, $(C_6H_5)_2Si$, $(C_6H_5)(CH_3)Si$, $(C_6R_5)_2Ge$, $(C_6H_5)_2Sn$, $(CH_2)_4Si$, $CH_2Si(C_3)_2$, o-$C_6H_4$ or 2,2'-$(C_6H_4)_2$. Z together with one or more radicals $R^1$ and/or $R^2$ can also form a monocyclic or polycyclic ring system.

Examples of metallocene catalyst components are, without constituting a limitation:

bis(cyclopentadienyl)titanium dichloride
bis(indenyl)titanium dichloride
bis(fluorenyl)titanium dichloride
bis(tetrahydroindenyl)titanium dichloride
bis(pentamethylcyclopentadienyl)titanium dichloride
bis(trimethylsilylcyclopentadienyl)titanium dichloride
bis(trimethoxysilylcyclopentadienyl)titanium dichloride
bis(isobutylcyclopentadienyl)titanium dichloride
bis(3-butenylcyclopentadienyl)titanium dichloride
bis(methylcyclopentadienyl)titanium dichloride
bis(1,3-di-tert-butylcyclopentadienyl)titanium dichloride
bis(trifluoromethylcyclopentadienyl)titanium dichloride
bis(tert-butylcyclopentadienyl)titanium dichloride
bis(n-butylcyclopentadienyl)titanium dichloride
bis(phenylcyclopentadienyl)titanium dichloride
bis(N,N-dimethylaminomethylcyclopentadienyl)titanium dichloride
bis(1,3-dimethylcyclopentadienyl)titanium dichloride
bis(1-methyl-3-n-butylcyclopentadienyl)titanium dichloride
(cyclopentadienyl)(methylcyclopentadienyl)titanium dichloride
(cyclopentadienyl)(n-butylcyclopentadienyl)titanium dichloride
(methylcyclopentadienyl)(n-butylcyclopentadienyl)titanium dichloride
(cyclopentadienyl)(1-methyl-3-n-butylcyclopentadienyl) titanium dichloride
methylenebis(cyclopentadienyl)titanium dichloride
methylenebis(3-methylcyclopentadienyl)titanium dichloride
methylenebis(3-n-butylcyclopentadienyl)titanium dichloride
methylenebis(indenyl)titanium dichloride
methylenebis(tetrahydroindenyl)titanium dichloride
dimethylsilanediylbis(cyclopentadienyl)titanium dichloride
dimethylsilanediylbis(tetramethylcyclopentadienyl)titanium dichloride
dimethylsilanediylbis(3-trimethylsilylcyclopentadienyl) titanium dichloride dimethylsilanediylbis(3-methylcyclopentadienyl)titanium dichloride
dimethylsilanediylbis(3-n-butylcyclopentadienyl)titanium dichloride
dimethylsilanediylbis(indenyl)titanium dichloride
dimethylsilanediylbis(tetrahydroindenyl)titanium dichloride
isopropylidenebis(cyclopentadienyl)titanium dichloride
isopropylidenebis(3-trimethylsilylcyclopentadienyl)titanium dichloride
isopropylidenebis(3-methylcyclopentadienyl)titanium dichloride
isopropylidenebis(3-n-butylcyclopentadienyl)titanium dichloride
isopropylidenebis(3-phenylcyclopentadienyl)titanium dichloride
isopropylidenebis(indenyl)titanium dichloride
isopropylidenebis(tetrahydroindenyl)titanium dichloride
1,2-ethanediylbis(cyclopentadienyl)titanium dichloride
1,2-ethanediylbis(3-methylcyclopentadienyl)titanium dichloride
1,2-ethanediylbis(3-n-butylcyclopentadienyl)titanium dichloride
1,2-ethanediylbis(3-phenylcyclopentadienyl)titanium dichloride
1,2-ethanediylbis(indenyl)titanium dichloride
1,2-ethanediylbis(tetrahydroindenyl)titanium dichloride
[(cyclopentadienyldimethylsilyl)(phenyl)amido]titanium dichloride
[(cyclopentadienyldimethylsilyl)(methyl)amido]titanium dichloride
[(cyclopentadienyldimethylsilyl)(tert-butyl)amido]titanium dichloride
[(cyclopentadienyldimethylsilyl)(cyclohexyl)amido]titanium dichloride bis(cyclopentadienyl)zirconium dichloride
bis(indenyl)zirconium dichloride
bis(fluorenyl)zirconium dichloride
bis(tetrahydroindenyl)zirconium dichloride
bis(1,3-di-tert-butylcyclopentadienyl)zirconium dichloride
bis(tetramethylcyclopentadienyl)zirconium dichloride
bis(trimethylsilylcyclopentadienyl)zirconium dichloride
bis(trimethoxysilylcyclopentadienyl)zirconium dichloride
bis(isobutylcyclopentadienyl)zirconium dichloride
bis(3-butenylcyclopentadienyl)zirconium dichloride
bis(methylcyclopentadienyl)zirconium dichloride
bis(trifluoromethylcyclopentadienyl)zirconium dichloride
bis(tert-butylcyclopentadienyl)zirconium dichloride
bis(n-butylcyclopentadienyl)zirconium dichloride
bis(phenylcyclopentadienyl)zirconium dichloride
bis(1,3-dimethylcyclopentadienyl)zirconium dichloride
bis(1-methyl-3-n-butylcyclopentadienyl)zirconium dichloride
(cyclopentadienyl)(methylcyclopentadienyl)zirconium dichloride
(cyclopentadienyl)(n-butylcyclopentadienyl)zirconium dichloride
(methylcyclopentadienyl)(n-butylcyclopentadienyl)zirconium dichloride
(cyclopentadienyl)(1-methyl-3-n-butylcyclopentadienyl)zirconium dichloride
methylenebis(cyclopentadienyl)zirconium dichloride
methylenebis(3-methylcyclopentadienyl)zirconium dichloride
methylenebis(3-n-butylcyclopentadienyl)zirconium dichloride
methylenebis(indenyl)zirconium dichloride
methylenebis(tetrahydroindenyl)zirconium dichloride
dimethylsilanediylbis(cyclopentadienyl)zirconium dichloride
dimethylsilanediylbis(tetramethylcyclopentadienyl)zirconium dichloride
dimethylsilanediylbis(3-trimethylsilylcyclopentadienyl)zirconium dichloride
dimethylsilanediylbis(3-methylcyclopentadienyl)zirconium dichloride
dimethylsilanediylbis(3-n-butylcyclopentadienyl)zirconium dichloride
dimethylsilanediylbis(indenyl)zirconium dichloride
dimethylsilanediylbis(tetrahydroindenyl)zirconium dichloride
isopropylidenebis(cyclopentadienyl)zirconium dichloride
isopropylidenebis(3-trimethylsilylcyclopentadienyl)zirconium dichloride
isopropylidenebis(3-methylcyclopentadienyl)zirconium dichloride
isopropylidenebis(3-n-butylcyclopentadienyl)zirconium dichloride
isopropylidenebis(3-phenylcyclopentadienyl)zirconium dichloride
isopropylidenebis(indenyl)zirconium dichloride
isopropylidenebis(tetrahydroindenyl)zirconium dichloride
1,2-ethanediylbis(cyclopentadienyl)zirconiumdichloride
1,2-ethanediylbis(3-methylcyclopentadienyl)zirconium dichloride
1,2-ethanediylbis(3-n-butylcyclopentadienyl)zirconium dichloride
1,2-ethanediylbis(3-phenylcyclopentadienyl)zirconium dichloride
1,2-ethanediylbis(indenyl)zirconium dichloride
1,2-ethanediylbis(tetrahydroindenyl)zirconium dichloride bis(cyclopentadienyl)hafnium dichloride
bis(trimethylsilylcyclopentadienyl)hafnium dichloride
bis(methylcyclopentadienyl)hafnium dichloride
bis(n-butylcyclopentadienyl)hafnium dichloride
bis(1,3-dimethylcyclopentadienyl)hafnium dichloride
methylenebis(cyclopentadienyl)hafnium dichloride
methylenebis(3-n-butylcyclopentadienyl)hafnium dichloride
dimethylsilanediylbis(cyclopentadienyl)hafnium dichloride
dimethylsilanediylbis(3-methylcyclopentadienyl)hafnium dichloride
dimethylsilanediylbis(3-n-butylcyclopentadienyl)hafnium dichloride
isopropylidenebis(cyclopentadienyl)hafnium dichloride
1,2-ethanediylbis(cyclopentadienyl)hafnium dichloride
1,2-ethanediylbis(3-methylcyclopentadienyl)hafnium dichloride
1,2-ethanediylbis(3-n-butylcyclopentadienyl)hafnium dichloride
[(cyclopentadienyldimethylsilyl)(phenyl)amido]zirconium dichloride
[(cyclopentadienyldimethylsilyl)(methyl)amido]zirconium dichloride
[(cyclopentadienyldimethylsilyl)(tert-butyl)amido]zirconium dichloride
[(cyclopentadienyldimethylsilyl)(cyclohexyl)amido]zirconium dichloride 1-silacyclopentane-1,1-bis(indenyl)zirconium dichloride
1,6-bis[methylsilylbis(indenyl)zirconium dichloride]hexane
1,4-disila-1,4-bis[cyclopentadienylzirconium dichloride]cyclohexane 1,4-disila-1,4-bis[cyclopentadienyltitandichlorid] cyclohexane.

Further examples are the corresponding metallocene compounds in which one or both of the chloride ligands are replaced by bromide, iodide or methyl.

As catalyst component based on a late transition metal, the catalyst composition of the present invention preferably comprises a nickel, rhodium, platinum, iron, ruthenium, cobalt or palladium compound, particularly preferably a nickel, iron or palladium compound. The late transition metal compound preferably contains, exclusively or in combination with other ligands, ligands which coordinate to the metal in a chelating fashion via two or more atoms. The two coordinating atoms are preferably nitrogen atoms. Particular preference is given to ligands of the formulae II and III below.

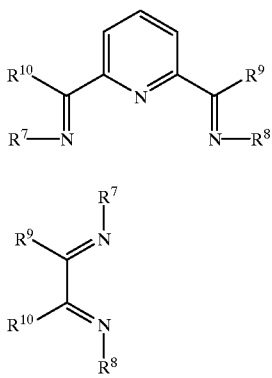

In these formulae, $R^7$ and $R^8$ are, independently of one another, identical or different $C_1$–$C_{40}$-hydrocarbon radicals in which the carbon atom joined to the nitrogen atom is preferably joined to at least two further carbon atoms. $R^7$ and $R^8$ are preferably $C_6$–$C_{20}$-aryl radicals which are preferably substituted in both ortho positions, eg. by $C_1$–$C_{10}$-alkyl radicals such as methyl or isopropyl. $R^9$ and $R^{10}$ are, independently of one another, identical or different and are each hydrogen or a $C_1$–$C_{40}$-hydrocarbon radical such as $C_1$–$C_{20}$-alkyl or $C_6$–$C_{20}$-aryl, or $R^9$ and $R^{10}$ together form a ring system which is preferably derived from acenaphthenequinone.

Particular preference is given to nickel or palladium compounds, in particular those in the oxidation states zero or two and containing the ligands of the formula III.

Also preferred are iron, ruthenium, cobalt or rhodium catalysts containing ligands of the formula II.

As catalyst component based on a late transition metal, the catalyst composition of the present invention preferably comprises the nickel or palladium compounds described in WO 96/23010 (which is hereby expressly incorporated by reference) which have a ligand coordinated in a bidentate fashion via nitrogen atoms.

The late transition metal component can already contain the ligand coordinating to the metal or it can be prepared in situ (ie. in the polymerization reactor) by combining a suitable transition metal component with the free ligand or a ligand derivative.

Examples of particularly useful late transition metal components are listed below. In these examples, An is a ligand of the formula III in which the radicals $R^9$ and $R^{10}$ form a ring system derived from acenaphthenequinone as shown in the following formula:

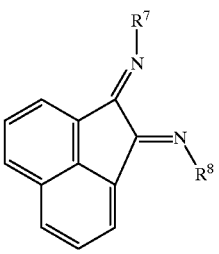

Me=methyl, Et=ethyl and $^i$Pr=isopropyl.

The examples of late transition metal compounds are:

[{(2,6-$^i$Pr$_2$C$_6$H$_3$)—N═C(H)—C(H)═N-(2,6-$^i$Pr$_2$C$_6$H$_3$)}NiBr$_2$]
[{(2,6-$^i$Pr$_2$C$_6$H$_3$)—N═C(Me)—C(Me)═N-(2,6-$^i$Pr$_2$C$_6$H$_3$)}NiBr$_2$]
[{(2,6-$^i$Pr$_2$C$_6$H$_3$)—N═C(An)—C(An)═N-(2,6-$^i$Pr$_2$C$_6$H$_3$)}NiBr$_2$]
[{(2,6-Me$_2$C$_6$H$_3$)—N═C(H)—C(H)═N-(2,6-Me$_2$C$_6$H$_3$)}NiBr$_2$]
[{(2,6-Me$_2$C$_6$H$_3$)—N═C(Me)—C(Me)═N-(2,6-Me$_2$C$_6$H$_3$)}NiBr$_2$]
[{(2,6-Me$_2$C$_6$H$_3$)—N═C(An)—C(An)═N-(2,6-Me$_2$C$_6$H$_3$)}NiBr$_2$]

[{(2,6-$^i$Pr$_2$C$_6$H$_3$)—N═C(H)—C(H)═N-(2,6-$^i$Pr$_2$C$_6$H$_3$)}PdMe(NC—Me)]$^+$SbF$_6^-$
[{(2,6-$^i$Pr$_2$C$_6$H$_3$)—N═C(Me)—C(Me)═N-(2,6-$^i$Pr$_2$C$_6$H$_3$)}PdMe(NC13 Me)]$^+$SbF$_6^-$
[{(2,6-$^i$Pr$_2$C$_6$H$_3$)—N═C(An)—C(An)═N-(2,6-$^i$Pr$_2$C$_6$H$_3$)}PdMe(NC—Me)]$^+$SbF$_6^-$
[{(2,6-$^i$Pr$_2$C$_6$H$_3$)—N═C(H)—C(H)═N-(2,6-$^i$Pr$_2$C$_6$H$_3$)}PdMe(NC—Me)]$^+$BF$_4^-$
[{(2,6-$^i$Pr$_2$C$_6$H$_3$)—N═C(Me)—C(Me)═N-(2,6-$^i$Pr$_2$C$_6$H$_3$)}PdMe(NC—Me)]$^+$BF$_4^-$
[{(2,6-$^i$Pr$_2$C$_6$H$_3$)—N═C(An)—C(An)═N-(2,6-$^i$Pr$_2$C$_6$H$_3$)}PdMe(NC—Me)]$^+$BF$_4^-$
[{(2,6-$^i$Pr$_2$C$_6$H$_3$)—N═C(H)—C(H)═N-(2,6-$^i$Pr$_2$C$_6$H$_3$)}Pd(NC—Me)$^2$]$^{2+}$(SbF$_6^-$)
[{(2,6-$^i$Pr$_2$C$_6$H$_3$)—N═C(Me)—C(Me)═N-(2,6-$^i$Pr$_2$C$_6$H$_3$)}Pd(NC—Me)$_2$]$^{2+}$(SbF$_6^-$)
[{(2,6-$^i$Pr$_2$C$_6$H$_3$)—N═C(An)—C(An)═N-(2,6-$^i$Pr$_2$C$_6$H$_3$)}Pd(NC—Me)$_2$]$^{2+}$(SbF$_6^-$)
[{(2,6-$^i$Pr$_2$C$_6$H$_3$)—N═C(H)—C(H)═N-(2,6-$^i$Pr$_2$C$_6$H$_3$)}Pd(NC—Me)$_2$]$^{2+}$(BF$_4^-$)$_2$
[{(2,6-$^i$Pr$_2$C$_6$H$_3$)—N═C(Me)—C(Me)═N-(2,6-$^i$Pr$_2$C$_6$H$_3$)}Pd(NC—Me)$_2$]$^{2+}$(BF$_4^-$)
[{(2,6-$^i$Pr$_2$C$_6$H$_3$)—N═C(An)—C(An)═N-(2,6-$^i$Pr$_2$C$_6$H$_3$)}Pd(NC—Me)$_2$]$^{2+}$(BF$_4^-$)$_2$

[{(2,6-$^i$Pr$_2$C$_6$H$_3$)—N═C(H)—C(H)═N-(2,6-$^i$Pr$_2$C$_6$H$_3$)}NiMe(OEt$_2$)]$^+$
[B{3,5-(F$_3$C)$_2$C$_6$H$_3$}$_4$]$^-$
[{(2,6-$^i$Pr$_2$C$_6$H$_3$)—N═C(Me)—C(Me)═N-(2,6-$^i$Pr$_2$C$_6$H$_3$)}NiMe(OEt$_2$)]$^+$
[B{3,5-(F$_3$C)$_2$C$_6$H$_3$}$_4$]$^-$
[{(2,6-$^i$Pr$_2$C$_6$H$_3$)—N═C(An)—C(An)═N-(2,6-$^i$Pr$_2$C$_6$H$_3$)}NiMe(OEt$_2$)]$^+$
[B{3,5-(F$_3$C)$_2$C$_6$H$_3$}$_4$]$^-$
[{(2,6-$^i$Pr$_2$C$_6$H$_3$)—N═C(H)—C(H)═N-(2,6-$^i$Pr$_2$C$_6$H$_3$)}NiMe(NC—Me)]$^+$SbF$_6^-$
[{(2,6-$^i$Pr$_2$C$_6$H$_3$)—N═C(An)—C(An)═N-(2,6-$^i$Pr$_2$C$_6$H$_3$)}NiMe(NC—Me)]$^+$SbF$_6^-$
[{(2,6-$^i$Pr$_2$C$_6$H$_3$)—N═C(Me)—C(Me)═N-(2,6-$^i$Pr$_2$C$_6$H$_3$)}NiMe(NC—Me)]$^+$SbF$_6^-$

[2,6-{(2,6-$^i$Pr$_2$C$_6$H$_3$)—N=C(Me)}pyridyl]FeBr$_2$
[2,6-{(2,6-Me$_2$C$_6$H$_3$)—N=C(Me)}pyridyl]FeBr$_2$
[2,6-{(2,6-$^i$Pr$_2$C$_6$H$_3$)—N=C(Me)}pyridyl]CoBr$_2$
[2,6-{(2,6-Me$_2$C$_6$H$_3$)—N=C(Me)}pyridyl]CoBr$_2$
[2,6-{(2,6-$^i$Pr$_2$C$_6$H$_3$)—N=C(Me)}pyridyl]FeBr$_3$
[2,6-{(2,6-Me$_2$C$_6$H$_3$)—N=C(Me)}pyridyl]FeBr$_3$
[2,6-{(2,6-$^i$Pr$_2$C$_6$H$_3$)—N=C(Me)}pyridyl]CoBr$_3$
[2,6-{(2,6-Me$_2$C$_6$H$_3$)—N=C(Me)}pyridyl]CoBr$_3$ In place of the dibromides listed, it is also possible to use the corresponding compounds in which one or both of the bromide ligands are replaced by chloride, iodide or methyl.

Further examples of suitable polymerization catalyst components based on a late transition metal are reaction products of nickel compounds with (Me$_3$Si)N=P{N(SiMe$_3$)$_2$}=N(SiMe$_3$) or (2,4,6-Me$_3$C$_6$H$_2$)P=C(OSiMe$_3$)—PH(2,4,6-Me$_3$C$_6$H$_2$).

The catalyst composition of the present invention preferably comprises one or more activators such as Lewis acids.

As Lewis acid activators, preference is given to using boron compounds such as boranes or aluminum compounds such as aluminum alkyls or aluminoxanes. Examples of suitable activators are boranes such as trifluoroborane, triphenylborane, tris(4-fluorophenyl)borane, tris(3,5-difluorophenyl)borane, tris(4-fluoromethylphenyl)borane, tris(pentafluorophenyl)borane, tris(tolyl)borane, tris(3,5-dimethylphenyl)borane, tris(3,5-difluorophenyl)-borane, tris(3,4,5-trifluorophenyl)borane or dimethylanilinium [tetrakis(pentafluorophenyl)borate], [H(OEt$_2$)][B{3,5-(CF$_3$)$_2$C$_6$F$_3$}$_4$], aluminum alkyls such as Al(C$_2$H$_5$)$_3$, Al(CH$_2$CH(CH$_3$)$_2$)$_3$, Al(C$_3$H$_7$)$_3$, Al((CH$_2$)$_3$CH$_3$)$_3$, Al((CH$_2$)$_5$CH$_3$)$_3$, Al(C$_6$F$_5$)$_3$, Al(C$_2$H$_5$)$_2$Cl, Al$_2$(C$_2$H$_5$)$_3$Cl$_2$ or AlCl$_3$, or aluminoxanes such as methylaluminoxane, isobutylaluminoxane, butylaluminoxane, heptylaluminoxane and methylbutylaluminoxane. Particular preference is given to using aluminoxanes.

The activator can be used in any amounts based on the transition metal components of the catalyst composition of the present invention; it is preferably used in excess or in a stoichiometric amount. It is possible to activate the early transition metal component and the late transition metal component of the catalyst composition using the same activator or different activators. Preferably, the same activator is used for all transition metal components. The activation of the various transition metal components can be carried out at the same place, eg. in the reactor, or at different places. In a preferred embodiment, an excess of the activator is mixed with the early transition metal component and this mixture is added to the late transition metal component which has already been contacted with the monomer.

As activator for the catalyst component based on a late transition metal, preference is given to using an aluminoxane.

As activator for the catalyst component based on an early transition metal, preference is given to using an aluminum alkyl in the case of a Ziegler catalyst component and to using an aluminoxane and/or a borane in the case of a metallocene catalyst component.

It is possible but not necessary for the catalyst composition of the present invention to comprise one or more support components. In this case, both the early and the late transition metal components can be supported, or only one of the two components can be supported. In a preferred embodiment, both components are supported in order to ensure that the various catalyst centers are relatively close together and thus to ensure good mixing of the different polymers formed.

The support component is preferably a porous inorganic or organic solid. The support material preferably comprises at least one inorganic halide such as MgCl$_2$ or an inorganic oxide such as SiO$_2$, Al$_2$O$_3$, MgO, ZrO$_2$, TiO$_2$, B$_2$O$_3$, CaO, ZnO, ThO$_2$, carbonates such as Na$_2$CO$_3$, K$_2$CO$_3$, CaCO$_3$, MgCO$_3$, sulfates such as Na$_2$SO$_4$, Al$_2$(SO$_4$)$_3$, BaSO$_4$, nitrates such as KNO$_3$, Mg(NO$_3$)$_2$, Al(NO$_3$)$_3$ or oxides such as Na$_2$O, K$_2$O, Li$_2$O, in particular silicon oxide and/or aluminum oxide or it preferably comprises at least one homopolymer or copolymer which may be crosslinked, eg. polyethylene, polypropylene, polybutene, polystyrene, divinylbenzene-crosslinked polystyrene, polyvinyl chloride, acryl-butadiene-styrene copolymers, polyamide, polymethacrylate, polycarbonate, polyester, polyacetal or polyvinyl alcohol. Polymer blends can also be used.

The support material may be pretreated, eg. by heating at from 50° C. to 1000° C., eg. in a stream of inert gas or under reduced pressure at from 0.01 bar to 0.001 bar, or by mixing or reacting with a chemical compound. The chemical compound can react with catalyst poisons, eg. aluminum alkyls, magnesium alkyls, boron alkyl or lithium alkyls, or lead to a functionalization of the surface of the support. It is immaterial whether the support material bears functional groups at the outset or these are introduced only after the pretreatment by means of appropriate reactions on the surface.

The application to the support can be carried out by mixing the individual catalyst components in any order. Thus, for example, the early transition metal compound and the late transition metal compound can be applied to the optimally pretreated support (eg. comprising SiO$_2$) and subsequently admixed with the activator, preferably in the presence of monomer.

The present invention further relates to a process for the polymerization of olefins in the presence of the catalyst composition of the present invention. The term polymerization includes both homopolymerization and copolymerization.

The catalyst system of the present invention can be used for reacting one or more olefinic comonomers such as ethylene or C$_3$–C$_{20}$-α-olefins. If two or more comonomers are used, the early and the late transition metal components can be active for all monomers used, although it is also possible for one transition metal component to specifically react only one or more of the monomers used. For example, ethylene and an α-olefin, which preferably has from 3 to 20 carbon atoms, can be used. This gives a mixture of two copolymers or a mixture of one copolymer with an ethylene homopolymer. The copolymer having the lower proportion of α-olefin is preferably formed by the late transition metal component. In the process of the present invention, particular preference is given to homopolymerizing ethylene, giving a blend of at least two different polyethylenes which have a different branching structure.

The polymerization process can be carried out in the liquid phase or in the gas phase. The process is preferably carried out in the liquid phase. As solvents or suspension media, preference is given to using inert organic compounds. Particular preference is given to using aromatic or aliphatic hydrocarbons or their mixtures. Particularly suitable solvents or suspension media are toluene, xylenes and saturated aliphatic C$_{10}$–C$_{30}$-hydrocarbons. The process can also be carried out in supercritical media.

The polymerization process is preferably carried out at from –100 to 300° C., preferably from 0 to 200° C., particularly preferably from 25 to 150° C. The process is carried out in the pressure range from 1 to 300 atm, preferably from 1 to 100 atm, particularly preferably from 3 to 30 atm. The process can be carried out in one or more stages.

The selection of appropriate reaction conditions, eg. temperature, addition of chain transfer agents such as hydrogen, monomer concentrations and the catalyst concentrations makes it possible to control the molecular weight distributions, degree of branching and other properties of the polymers formed. The degree of branching of the polymers can be controlled via the concentration of the monomers. The reaction can also be carried out in two or more reactors connected in series. Feeding the catalyst components into the individual reactors makes it possible to change the ratio of the two catalysts.

The productivity of each individual transition metal component is preferably above 2800 kg of polymer/(mole of transition metal×h), particularly preferably above 15,000 kg of polymer/(mole of transition metal×h).

The catalyst composition of the present invention is suitable for preparing reactor blends of two or more polymers which have advantageous use and processing properties. The number average molar masses of the individual polymer fractions are preferably in the range from 11 to 10,000 kg/mole, particularly preferably from 20 to 1000 mole. The molar ratio of the early transition metal component(s) to the late transition metal component(s) can be in the range from 0.1:99.9 to 99.9:0.1, preferably from 1:30 to 1:1. The ratio of the proportions of polymers formed by the early transition metal catalyst and by the late transition metal catalyst can be in the range from 0.1:99.9 to 99.9:0.1, preferably from 10:90 to 90:10, particularly preferably from 1:1 to 50:1.

The polymerization process of the present invention is particularly suitable for the homopolymerization of ethylene to give a blend of two or more polymers of which at least one has the following branching structure: it contains at least 10 branches per 1000 carbon atoms and at least two ethyl branches, at least one butyl branch and from one to fifty amyl or higher branches are present per 100 methyl branches.

The polymerization process of the present invention is particularly preferably used for the polymerization of ethylene to give a blend of two or more polymers of which at least one has the following branching structure: it contains at least 30 branches per 1000 carbon atoms and at least four ethyl branches, at least two butyl branches and from two to thirty amyl or higher branches are present per 100 methyl branches.

In particular, it is possible to obtain a reactor blend of two polyethylenes of which preferably one contains >10 branches/1000 carbon atoms, preferably >20 branches/1000 carbon atoms, particularly preferably >40 branches/1000 carbon atoms.

The preparation of the polymer blend in the reactor reduces the energy consumption, requires no subsequent blending processes and makes it possible to control the molecular weight distributions and the molecular weight fractions of the various polymers in a simple manner. In addition, good mixing of the polymers can be achieved. The preparation of a blend of two or more polymers having different degrees of branching from ethylene without addition of a comonomer reduces the costs for the olefins used, and also the plant and other costs for providing the comonomer.

The following examples illustrate the invention:

EXAMPLE 1

A solution of 2.2 mg of [{(2,6-$^i$Pr$_2$C$_6$H$_3$)—N=C(An)—C(An)=N-(2,6-$^i$Pr$_2$C$_6$H$_3$)}NiBr$_2$] in 600 ml of toluene was placed in a 1 l steel autoclave fitted with a heating/cooling jacket and a mechanical stirrer. The solution was saturated with ethylene by stirring briefly under 10 atm of ethylene. The reactor was then depressurized and a solution of 0.05 mg of bis(cyclopentadienyl)zirconium dichloride in 10 ml of a 10% strength methylaluminoxane solution in toluene was added. The autoclave was closed and a constant pressure of 10 atm of ethylene was applied. The autoclave was heated to 50° C. After 15 minutes, the reaction was interrupted by venting the ethylene and destroying the catalyst by means of isopropanol.

The reaction mixture obtained was poured into 1 l of methanol acidified with HCl. The polymer product obtained was dried under reduced pressure, giving 33.4 g of polymer.

1H-NMR (1,2-C$_6$D$_4$Cl$_2$: 120° C.): 21 branches/1000 carbon atoms

EXAMPLE 2

Example 1 was repeated using 0.28 mg of the nickel compound and 0.175 mg of Cp$_2$ZrCl$_2$. The polymerization was carried out at 40° C. and was stopped after half an hour. 5.8 g of polymer were obtained.

1H-NMR (1,2-C$_6$D$_4$Cl$_2$: 120° C.): 12 branches/1000 carbon atoms.

What is claimed is:

1. A catalyst composition comprising at least two different polymerization catalysts of which
   a) at least one is a polymerization catalyst based on an early transition metal components and
   b) at least one is a polymerization catalyst based on a late transition metal component, wherein the early transition metal component is a Ziegler catalyst component which is a compound of a metal selected from the group consisting
      of titanium, zirconium, hafnium, vanadium, niobium and chromium and/or a metallocene catalyst component which is a cyclopentadienyl complex of metals of groups IIIa, IVa or Va of the Periodic Table of Elements, of the lanthanide group or of chromium.

2. A catalyst composition as claimed in claim 1, wherein each of the transition metal components has a productivity which is greater than 2800 kg of polymer/(mole of transition metal×h).

3. A catalyst composition as claimed in claim 1 to 2 further comprising one or more activators.

4. A catalyst composition as claimed in claim 1 further comprising one or more supports.

5. A process for the polymerization of olefins in the presence of a catalyst composition as claimed in claim 1.

6. A process as claimed in claim 3 in which ethylene is polymerized.

7. The use of a catalyst composition as claimed in of claim 1 for olefin polymerization.

* * * * *